United States Patent
Leppin et al.

(10) Patent No.: US 12,469,301 B2
(45) Date of Patent: Nov. 11, 2025

(54) REAR-VIEW STEREO CAMERA SYSTEM

(71) Applicant: Continental Autonomous Mobility Germany GmbH, Ingolstadt (DE)

(72) Inventors: Heiko Leppin, Hergensweiler (DE); Stefan Heinrich, Kressbronn (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 181 days.

(21) Appl. No.: 18/166,293

(22) Filed: Feb. 8, 2023

(65) Prior Publication Data
US 2023/0252793 A1 Aug. 10, 2023

(51) Int. Cl.
*G06V 20/56* (2022.01)
*G06T 7/20* (2017.01)
(Continued)

(52) U.S. Cl.
CPC ............ *G06V 20/56* (2022.01); *G06T 7/20* (2013.01); *G06V 10/761* (2022.01);
(Continued)

(58) Field of Classification Search
CPC .......... F02B 2023/108; F02B 2075/125; F02B 23/104; F02F 3/26; Y02T 10/12; H04R 1/1041; H04R 2225/0216; H04R 25/30; H04R 25/70; H04R 29/00; B60R 1/25; B60R 1/31; B60R 11/04; B60R 2300/8046; G06T 2207/10012; G06T 2207/20084; G06T 2207/20228; G06T 2207/30252;
(Continued)

(56) References Cited

U.S. PATENT DOCUMENTS 11,343,485 B1 * 5/2022 Pighi .................. B60R 11/04
2008/0304705 A1 * 12/2008 Pomerleau ............ B60R 1/26
348/148
(Continued)

FOREIGN PATENT DOCUMENTS

DE 10008520 A1 8/2000
DE 10343866 A1 4/2005
(Continued)

OTHER PUBLICATIONS

European Patent Office Search Report dated Jul. 25, 2022 for the counterpart European Patent Application No. 22155749-9.
(Continued)

*Primary Examiner* — Kathleen M Walsh

(57) ABSTRACT

The disclosure relates to a vehicle camera system, including two pairs of cameras. A first pair of cameras is arranged at the left side portion of the vehicle cabin and a second pair of cameras is arranged at the right side portion of the cabin. The cameras of the first and second pair of cameras are arranged one above the other in a vertical direction. The first and second pairs of cameras build rear-viewing stereo camera systems for providing image and distance information of areas on the left and right sides of the vehicle, respectively. The cameras of the first and second pair of cameras are arranged by one or more spacers at the vehicle cabin, the spacers providing a lateral distance of the cameras to the vehicle cabin. The cameras of each pair of cameras have a vertical distance of at least 0.5 m.

19 Claims, 3 Drawing Sheets

(51) Int. Cl.
  *G06V 10/74* (2022.01)
  *H04N 13/204* (2018.01)
(52) U.S. Cl.
  CPC . *H04N 13/204* (2018.05); *G06T 2207/10012* (2013.01); *G06T 2207/20084* (2013.01); *G06T 2207/20228* (2013.01); *G06T 2207/30252* (2013.01); *G06V 2201/07* (2022.01)
(58) Field of Classification Search
  CPC ........ G06T 7/20; G06V 10/761; G06V 20/56; G06V 2201/07; H04N 13/204
  USPC .......................................................... 348/148
  See application file for complete search history.

(56) References Cited

U.S. PATENT DOCUMENTS

| | | | | |
|---|---|---|---|---|
| 2014/0285667 | A1* | 9/2014 | Aimura | G08G 1/166 348/148 |
| 2016/0026881 | A1* | 1/2016 | Broggi | B60R 11/04 348/47 |
| 2016/0137126 | A1* | 5/2016 | Fürsich | B60R 1/26 348/148 |
| 2020/0104604 | A1* | 4/2020 | Yoshikawa | G06V 20/56 |
| 2021/0326694 | A1* | 10/2021 | Wang | G06N 3/084 |
| 2021/0350576 | A1* | 11/2021 | Jiang | H04N 13/271 |

FOREIGN PATENT DOCUMENTS

| | | |
|---|---|---|
| DE | 102017006176 A1 | 12/2017 |
| DE | 102019213607 A1 * | 3/2021 |
| MA | 36097 B1 * | 1/2016 |

OTHER PUBLICATIONS

European Examination Report dated Mar. 4, 2024 for the priority European Patent Application No. 22 155 749.9 and translation of same.

* cited by examiner

REAR-VIEW STEREO CAMERA SYSTEM

CROSS-REFERENCE TO RELATED APPLICATIONS

The present application claims the benefit and priority of European Patent Application No. 22155749.9 filed on Feb. 8, 2022, the content of which is incorporated by reference herein.

TECHNICAL FIELD

The present invention relates generally to the field of camera systems. More specifically, the invention relates to a rear-view stereo camera system providing information of the left and right side areas and a back area behind a utility vehicle.

BACKGROUND

Stereo camera systems in automotive applications are already known in order to provide image information of the scene in front of the ego-vehicle. The cameras are typically used in a horizontal arrangement, i.e., the cameras are arranged next to each other at a horizontal distance. Therefore, stereo cameras for automobile applications are usually optimized for a wide horizontal baseline.

In the field of utility vehicles, specifically trucks including a towing vehicle and a trailer, the mounting of sensors on the rear end of the trailer for monitoring the rear space is not useful because the trailer can be changed and must therefore be compatible with different towing vehicles. On the other hand, the trailer limits the view of cameras arranged at the back side of the cabin of the towing vehicle.

SUMMARY

It is an objective of the embodiments of the present disclosure to provide a camera system for a utility vehicle which provides rear-view stereo camera images which can be used for capturing images of the side areas and back area of the utility vehicle, the images either be used by a human driver or by an autonomous driving system for taking driving decisions.

The objective is recited in the features of independent claim 1. Embodiments are given in the dependent claims. If not explicitly indicated otherwise, embodiments of the present disclosure can be freely combined with each other.

According to an aspect, the embodiments refer to a camera system for a utility vehicle. The camera system includes two pairs of cameras. A first pair of cameras is arranged at the left side portion of the cabin of the utility vehicle, preferably at the front portion in the transition area between the front window and the left side window. A second pair of cameras is arranged at the right side portion of the cabin of the utility vehicle, preferably at the front portion in the transition area between the front window and the right side window. The cameras of the first and second pair of cameras are arranged one above the other in a vertical direction. The first pair of cameras builds a rear-viewing stereo camera system for providing image information and distance information of an area on the left side of the utility vehicle. The second pair of cameras builds a rear-viewing stereo camera system for providing image information and distance information of an area on the right side of the utility vehicle. The cameras of the first and second pair of cameras are arranged by means of one or more spacers at the cabin of the utility vehicle. The spacers provide a lateral distance of the cameras to the cabin, e.g., a distance of 10 cm or more. The cameras of each pair of cameras have a vertical distance of at least 0.5 m.

The camera system is advantageous because it provides image and distance information of objects besides and behind the utility vehicle independent of a potential trailer arranged at the utility vehicle and additionally reduces the occlusion caused by a trailer of the utility vehicle.

According to an example embodiment, a first camera of the pairs of cameras is arranged as an upper camera in a height area between the top of the cabin and the upper edge of a side window of the cabin. Thereby, the upper camera provides image information from the top or essentially the top of the cabin which is advantageous for observing objects behind the utility vehicle and for obtaining a large distance between the upper and lower camera of the pair of cameras.

According to an example embodiment, a second camera of the pairs of cameras is arranged as a lower camera in a height area between the upper edge of the side window and the lower edge of the side window. Thereby, the lower camera provides image information in a height which is advantageous for observing pedestrians or cyclists. In addition, a large distance between the upper and lower camera of the pair of cameras can be obtained.

According to an example embodiment, a first camera of the pairs of cameras is arranged as an upper camera in a height range between 3.5 m and 4 m. Thereby the first cameras can provide an improved overview over the scene next to and behind the utility vehicle.

According to an example embodiment, a second camera of the pairs of cameras is arranged as a lower camera in a height range between 2 m and 3 m. Thereby, a sufficient distance to the upper cameras can be provided and the perspective of the second camera is different to the perspective of the first camera which is advantageous for observing the area next to and behind the utility vehicle.

According to an example embodiment, the cameras comprise a rectangular or essentially rectangular field of view and the cameras are positioned to provide a portrait view. In other words, the height of the field of view is greater than the width of the field of view. Thereby it is possible to reduce the blind spot of the camera system and adapt the field of view of the camera system to a vertically-aligned rectangular field of view.

According to an example embodiment, the cameras provide a field of view with a vertical aperture angle in the range between 25° and 35° and a horizontal aperture angle in the range between 15° and 25°. Thereby, an improved observation of the area next to and behind the utility vehicle is possible.

According to an example embodiment, the cameras are of greyscale type. Thereby it is possible to improve the sensitivity of the camera system and the operability at poor ambient light, e.g., in the evening or during the night because, in contrary to front-viewing cameras, there is no illumination of the area next to and behind the utility vehicle.

According to another embodiment, the cameras may be infrared cameras or cameras of greyscale type which have a sensitivity in the infrared wavelength region. Thereby the sensitivity at night can be increased.

According to an example embodiment, the first pair of cameras is configured to provide image information to a left rear view monitor and the second pair of cameras is configured to provide image information to a right rear view monitor for rear-view mirror replacement. Thereby, it is possible to use the camera system for monitoring the space next to and behind the utility vehicle similar to the left and right rear-view mirror and therefore remove the typically used rear-view mirrors attached to the cabin of the utility vehicle.

According to an example embodiment, the cameras include a nonlinear optic with a higher magnification in the center portion of the field of view than in the peripheral area of the field of view. Thereby it is possible to improve the resolution of the camera in the central portion of the field of view in order to obtain a high detection range and the ability to distinguish objects at high distances in the area covered by the central portion of the field of view paired with a wide range of field of view which is necessary for obtaining a large observation coverage of the near space around the utility vehicle.

According to an example embodiment, the camera system includes a control unit configured to compensate the magnification difference between the center portion and the peripheral area of the field of view. Thereby it is possible to remove the nonlinearity of the camera optic and provide image information at a display or monitor with equal magnification in order to ease perceiving of image information for a human driver of the utility vehicle.

According to an example embodiment, the camera system includes a control unit configured to provide information regarding object speed and/or object distance of one or more objects arranged behind the camera system. Thereby, the camera system provides information which are useful for a human driver and/or a driving assistance system for taking driving decisions.

According to an example embodiment, the camera system includes a left rear view monitor and a right rear view monitor and/or a display unit configured to display rear view images. The control unit is configured to highlight objects provided at the left rear view monitor, the right rear view monitor and/or the display unit based on information regarding object speed and/or object distances of one or more objects arranged behind the camera system. By displaying the information on monitors and/or displays of the utility vehicle, the human driver can recognize the information associated with the respective object and take driving decisions based on the information.

According to an example embodiment, the camera system includes a control unit which implements a trained neural network for calculating a disparity map and distance information to objects included in the image information provided by the cameras. Thereby, the quality of information provided by the stereo camera system can be improved.

According to a further aspect, a utility vehicle including a camera system according to anyone of the preceding embodiments is disclosed.

The term "utility vehicle" as used in the present disclosure may refer to a truck or any other vehicle designed to carry out a specific task. Specifically utility vehicle may refer to a semi which includes a towing vehicle and a trailer.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
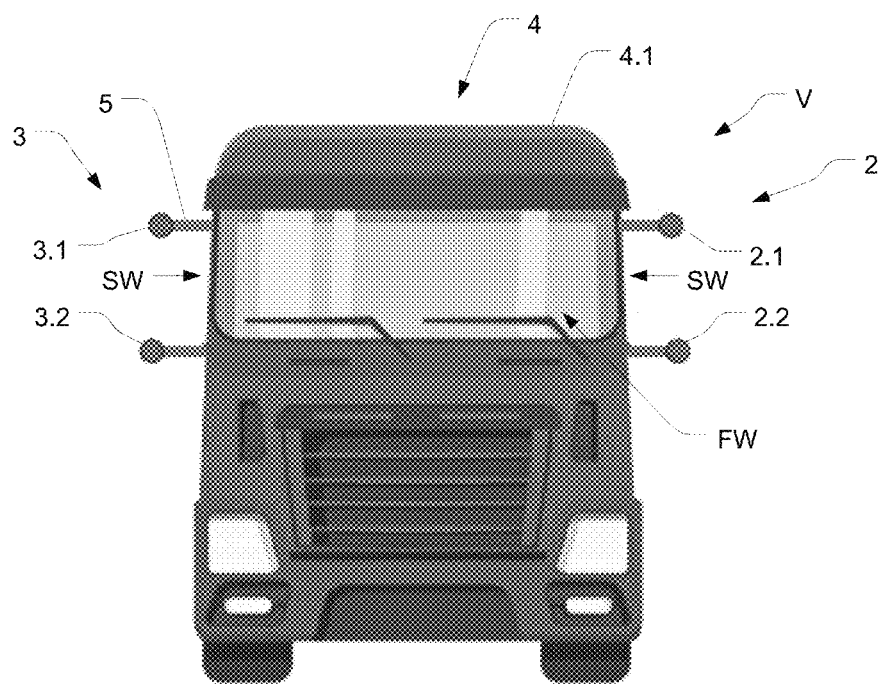
FIG. 1 shows a schematic front view of a truck including a camera system.

The present disclosure will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this present disclosure should not be construed as limited to the embodiments set forth herein. Throughout the following description similar reference numerals have been used to denote similar elements, parts, items or features, when applicable.

The features of the present disclosure disclosed in the specification, the claims, examples and/or the figures may both separately and in any combination thereof be material for realizing the present disclosure in various forms thereof.

FIG. 1 shows a schematic front view of a utility vehicle V, specifically of a truck. The utility vehicle V may include a towing vehicle V1 and a trailer V2. The utility vehicle V includes a camera system 1 for providing image information of the area at the left and right side next to the utility vehicle V and behind the trailer V2 of the utility vehicle V.

The camera system 1 includes two pairs of cameras 2, 3, namely a first pair of cameras 2 arranged at the left side of the utility vehicle V and a second pair of cameras 3 arranged at the right side of the utility vehicle V. The first and second pairs of cameras 2, 3 include rear-viewing cameras, i.e., the main capturing direction of the cameras is opposite to the forward driving direction. The first pair of cameras 2 provides image information of the left area next to and behind the utility vehicle V and the second pair of cameras 3 provides image information of the right area next to and behind the utility vehicle V. Thereby the images provided by the two pairs of cameras 2, 3 provide information of the space at the left and right side of the utility vehicle V and the space behind the utility vehicle V which is not occluded by the towing vehicle V1 or the trailer V2.

Each pair of cameras 2, 3 includes a first camera 2.1, 3.1 and a second camera 2.2, 3.2. The cameras of the pair of cameras 2, 3 are arranged one above the other, as shown in FIG. 1. The first cameras 2.1, 3.1 build upper cameras which are arranged above and at a distance to the second cameras 2.2, 3.2, i.e., the second cameras 2.2, 3.2 build lower cameras, each second camera 2.2, 3.2 being arranged below a first camera 2.1, 3.1.

Figure 2:
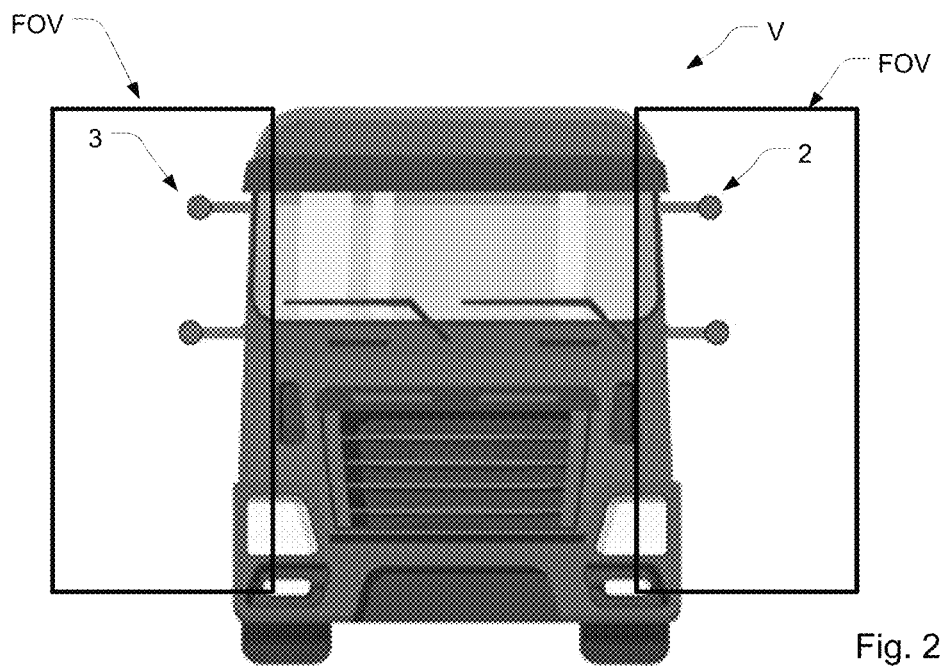
FIG. 2 schematically illustrates an example field of view of the pairs of cameras of the camera system.
Figure 3:
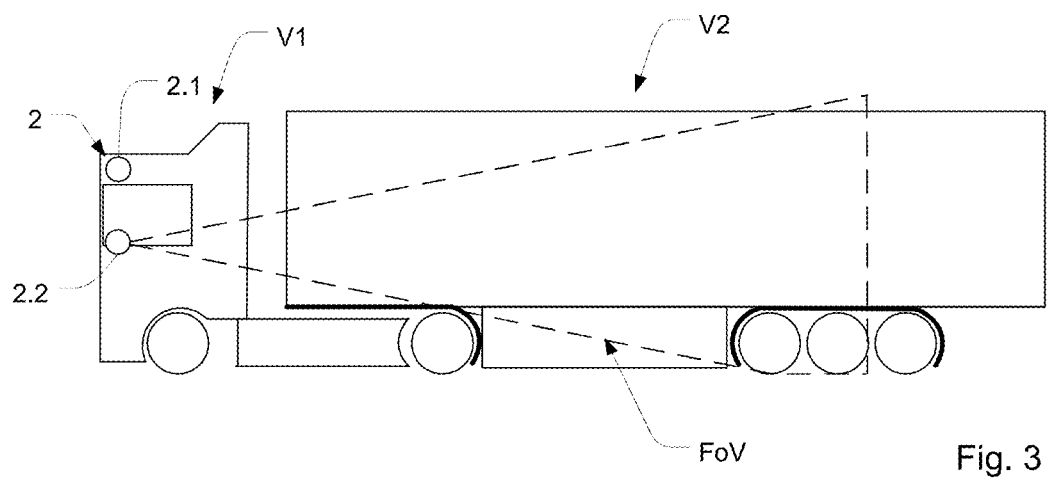
FIG. 3 schematically illustrates a side view of the truck and the vertical aperture of the field of view of the camera system.

As shown in FIGS. 1, 2 and 3, the first cameras 2.1, 3.1 are arranged at the left and right sides, respectively, of the cabin 4 at a height level equal or near to (e.g. 5 cm, 10 cm or 20 cm lower) the top outer edge 4.1 of the cabin 4. The first cameras 2.1, 3.1 arranged at the left and right side may be arranged at the same height level. For example, referring to ground level, the height of the first cameras 2.1, 3.1 may be in the range of 3.5 m to 4 m.

Furthermore, the second cameras 2.2, 3.2 are arranged at a height level equal or near to (e.g. 5 cm, 10 cm or 20 cm lower) the lower edge 4.1 of the side window SW of the cabin 4. In other words, the second cameras 2.2, 3.2 may be arranged at the height at which the lower edge of a rear view mirror is arranged. The second cameras 2.2, 3.2 arranged at the left and right side may be arranged at the same height level. For example, referring to ground level, the height of the second cameras 2.2, 3.2 may be in the range of 2 m to 2.5 m, specifically at 2.1 m, 2.2 m, 2.3 m or 2.4 m.

As shown in FIGS. 1 and 2, the cameras 2.1, 2.2, 3.1, 3.2 are arranged by means of spacers 5 at the cabin 4. The spacers 5 are configured to provide a horizontal distance between the outer cabin wall and the respective camera. Thereby, the occlusion due to the trailer can be reduced and the coverage range of the cameras 2.1, 2.2, 3.1, 3.2 can be increased.

Each pair of cameras 2, 3 may form a stereo camera system which is configured to determine distance information of detected objects by calculating a disparity map based on the pictures captured from both cameras and thereby developing a 3D point cloud. In addition, each stereo camera system may be configured to determine the speed of an object moving behind or at the respective side of the utility vehicle V.

The cameras of the pair of cameras 2, 3 have a vertical distance of at least 0.5 m in order to obtain reliable distance information by the respective stereo camera system.

As shown in FIG. 2, the cameras 2.1, 2.2, 3.1, 3.2 may have a rectangular field of view FOV, i.e., the width of the field of view may be smaller than the height of the field of view FOV. In other words, the cameras 2.1, 2.2, 3.1, 3.2 may provide image information in portrait view. Thereby, the vertical coverage is higher than the horizontal coverage which is suitable in most cases for monitoring the side and back area of the utility vehicle V.

However, according to another embodiment, the cameras 2.1, 2.2, 3.1, 3.2 may provide image information in landscape orientation, i.e., the width of the field of view may be greater than the height of the field of view FOV. Thereby a wider sideway field of view can be obtained which is beneficial for more narrow curve radii to be driven.

The cameras may provide grayscale-type image information. Using grayscale-type image information instead of coloured image information improves sensitivity and the possibility to use information of the camera system 1 also during night which is useful because in the side and back area there is no illumination by lamps of the ego-vehicle.

FIG. 3 shows a lateral view of a utility vehicle including the proposed camera system 1. The horizontal aperture angle of the cameras 2.1, 2.2, 3.1, 3.2 may be between 15° and 25°, specifically 20° or essentially 20°. The vertical aperture angle of the cameras 2.1, 2.2, 3.1, 3.2 may be between 25° and 35°, specifically 30° or essentially 30°.

The cameras 2.1, 2.2, 3.1, 3.2 may be aligned such that the inner image edge of the field of view FOV shows the side wall of the trailer V2 and field of view fans out laterally, as shown in FIG. 2.

Figure 4:
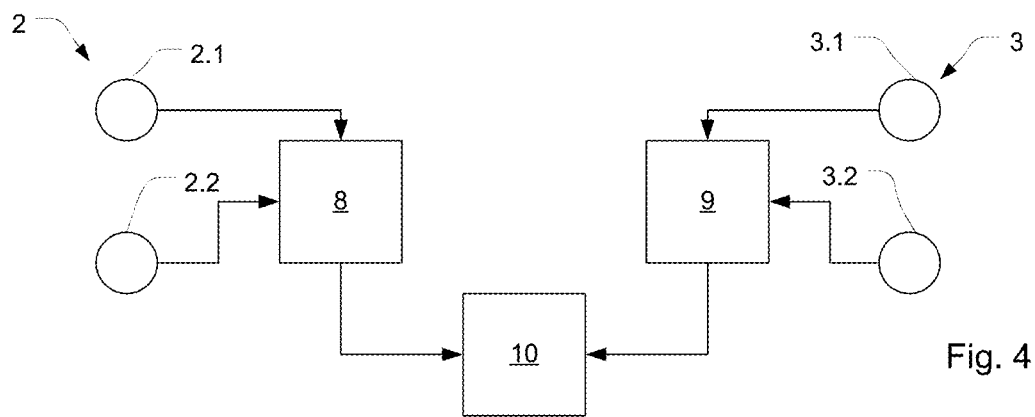
FIG. 4 schematically illustrates a block diagram of a first embodiment of the camera system.

FIG. 4 shows a schematic block diagram of a camera system 1. The first pair of cameras 2 is coupled with a first control unit 8 which is configured to provide a disparity map and a 3D point cloud of the left side area and back area next to the utility vehicle V. The second pair of cameras 3 is coupled with a second control unit 9 which is configured to provide a disparity map and a 3D point cloud of the right side area and back area next to the utility vehicle V.

The first and second control units 8, 9 are coupled with a central control unit 10. The central control unit 10 may combine information provided by the first and second control units 8, 9 and may derive information and/or may provide decisions based on information of the first and second control units 8, 9. For example, the central control unit 10 may be configured to perform object detection, extract obstacles and/or may determine driving decisions for autonomous driving functions.

Figure 5:
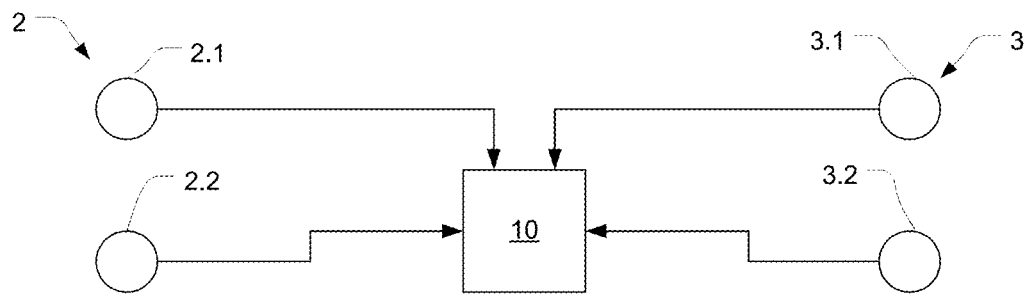
FIG. 5 schematically illustrates a block diagram of a second embodiment of the camera system.

However, in another embodiment, as shown in FIG. 5, the camera system 1 may only include a central control unit 10 and the functionality of the first and second control units 8, 9 may be integrated in the central control unit 10.

The central control unit 10 and/or the first and second control units 8, 9 may implement a neural network for calculating stereo image information, specifically a disparity map and 3D point cloud based on image information provided by the respective pair of cameras 2, 3. The neural network may be a trained neural network which has been trained by labelled training data. The training data may be derived from real data, i.e., data captured in real driving situations and/or may be artificial training data.

Figure 6:
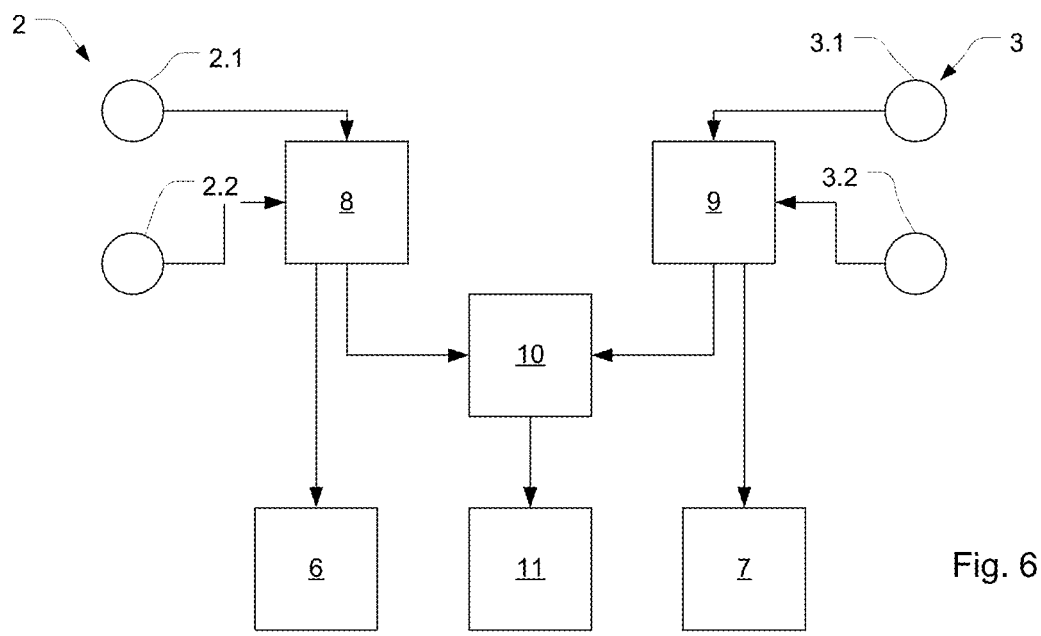
FIG. 6 schematically illustrates a block diagram of the camera system according to FIG. 4, the camera system additionally including monitors and/or a display for providing image information to the driver.

FIG. 6 shows a camera system 1 configured to replace rear view mirrors of the utility vehicle attached at the at the outer side walls of the cabin 4. The first control unit 8 may be coupled with a left rear view monitor 6 and the and second control unit 9 may be coupled with a right rear view monitor 7. The left rear view monitor 6 is configured to display image information of the left side area and the left back area of the utility vehicle V thereby being able to remove the left rear view mirror. Similarly, the right rear view monitor 7 is configured to display image information of the right side area and the right back area of the utility vehicle V thereby being able to remove the right rear view mirror.

Additionally or for replacing left and right rear view monitors 6, 7, the camera system 1 may include a central display unit 11 for providing information obtained by the cameras 2.1, 2.2, 3.1, 3.2 to the driver.

In order to obtain the required solution, obtain the required lateral width of field of view and being able to detect small objects at far distances, the detection range of the system might be reduced. In addition, nonlinear optics that implement a higher magnification in the centre of the image and lower magnification towards the border might be used in the cameras 2.1, 2.2, 3.1, 3.2. The central control unit 10 may be configured to compensate the nonlinear magnification, i.e., calculate an image with equal magnification. Thereby, the viewing of images provided by the camera system is eased for human drives. However, an automated driving function might not require such equalization of magnification.

The information regarding object distance and/or object speed derived by the stereo camera system can be used to highlight and/or apply such information to the respective objects in the respective rear view monitors 6, 7 and/or the display unit 11.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 camera system
2 first pair of cameras
2.1 upper camera
2.2 lower camera
3 second pair of cameras
3.1 upper camera
3.2 lower camera
4 cabin
4.1 top edge
5 spacer
6 left rear view monitor
7 right rear view monitor
8 first control unit
9 second control unit
10 central control unit
11 display unit
FOV field of view
FW front window
SW side window
V Vehicle
V1 towing vehicle
V2 trailer

The invention claimed is:

1. A camera system for a utility vehicle, the camera system comprising:
two pairs of cameras,
wherein a first pair of cameras is arranged at a left side portion of a cabin of a utility vehicle and a second pair of cameras is arranged at a right side portion of the cabin of the utility vehicle,
wherein the cameras of the first and second pair of cameras are arranged one above the other in a vertical direction,
wherein the first pair of cameras builds a rear-viewing stereo camera system for providing image information and distance information of an area on the left side of the utility vehicle and the second pair of cameras builds a rear-viewing stereo camera system for providing image information and distance information of an area on the right side of the utility vehicle,
wherein the cameras of the first and second pair of cameras are arranged by one or more spacers at the cabin of the utility vehicle, the spacers providing a lateral distance of the cameras to the cabin,
wherein the cameras of each pair of cameras have a vertical distance of at least 0.5 m, and
wherein the camera system further comprises at least one controller implementing a trained neural network for calculating a disparity map and distance information to objects included in the image information provided by the cameras.

2. The camera system according to claim 1, wherein a first camera of each pair of cameras is arranged as an upper camera in a height area between a top of the cabin and an upper edge of a side window of the cabin.

3. The camera system according to claim 1, wherein a second camera of each pair of cameras is arranged as a lower camera in a height area between an upper edge of a side window and a lower edge of a side window.

4. The camera system according to claim 1, wherein a first camera of each pair of cameras is arranged as an upper camera in a height range between 3.5 m and 4 m above ground level.

5. The camera system according to claim 1, wherein a second camera of each pair of cameras is arranged as a lower camera in a height range between 2 m and 3 m above ground level.

6. The camera system according to claim 1, wherein the cameras have a rectangular or essentially rectangular field of view and the cameras are positioned to provide a portrait view.

7. The camera system according to claim 1, wherein the cameras provide a field of view with a vertical aperture angle in a range between 25° and 35° and a horizontal aperture angle in a range between 15° and 25°.

8. The camera system according to claim 1, wherein the cameras are of greyscale type.

9. The camera system according to claim 1, wherein the first pair of cameras is configured to provide the image information to a left rear view monitor and the second pair of cameras is configured to provide the image information to a right rear view monitor for rear-view mirror replacement.

10. The camera system according to claim 1, wherein the cameras comprise a nonlinear optic with a higher magnification in a center portion of a field of view than in a peripheral area of the field of view.

11. The camera system according to claim 10, wherein the camera system comprises a controller configured to compensate the magnification difference between the center portion and the peripheral area of the field of view.

12. The camera system according to claim 1, wherein the camera system further comprises a controller configured to provide the information regarding object speed and/or object distances of one or more objects arranged behind the camera system.

13. The camera system according to claim 12, wherein the camera system further comprises a left rear view monitor, a right rear view monitor and/or a display configured to display rear view images, wherein the controller is configured to highlight objects provided at the left rear view monitor, the right rear view monitor and/or the display based on the information regarding object speed and/or object distances of the one or more objects arranged behind the camera system.

14. A utility vehicle comprising a camera system according to claim 1.

15. The camera system according to claim 1, wherein the at least one controller calculates a three-dimensional point cloud based on the image information provided by each pair of cameras, and determines driving decisions for autonomous driving functions based on the three-dimensional point cloud.

16. The camera system according to claim 1, wherein the at least one controller determines driving decisions for autonomous driving functions based on the disparity map and the distance information to the objects.

17. The camera system according to claim 1, wherein the distance information comprises a first three-dimensional point cloud of the area on the left side of the utility vehicle, and a second three-dimensional point cloud of the area on the right side of the utility vehicle, and the at least one controller determines one or more driving decisions for autonomous driving functions based on the first and second three-dimensional point clouds.

18. The camera system according to claim 17, wherein the disparity map comprises a first disparity map to the area on the left side of the utility vehicle, and a second disparity map the area on the right side of the utility vehicle, wherein the at least one controller determines the one or more driving decisions based in part upon the first and second disparity maps.

19. The camera system according to claim 18, wherein the at least one controller comprises a first controller communicatively coupled to the first pair of cameras and configured to calculate the first disparity map and the first three-dimensional point cloud, a second controller communicatively coupled to the second pair of cameras and configured to calculate the second disparity map and the second three-dimensional point cloud, and a third controller communicatively coupled to the first and second controller and configured to determine the one or more driving decisions.

* * * * *